Dec. 9, 1969 B. KAZAN 3,483,414

STORAGE TUBE HAVING FIELD EFFECT LAYER WITH CONDUCTING PINS EXTENDING THERETHROUGH SO THAT READOUT DOES NOT ERASE CHARGE PATTERN

Filed Sept. 29, 1966 2 Sheets-Sheet 1

INVENTOR.
BENJAMIN KAZAN
BY
Ronald Zibelli
ATTORNEY

Dec. 9, 1969 B. KAZAN 3,483,414

STORAGE TUBE HAVING FIELD EFFECT LAYER WITH CONDUCTING PINS EXTENDING THERETHROUGH SO THAT READOUT DOES NOT ERASE CHARGE PATTERN

Filed Sept. 29, 1966 2 Sheets-Sheet 2

INVENTOR.
BENJAMIN KAZAN

BY

Ronald Zibelli
ATTORNEY

United States Patent Office 3,483,414

Patented Dec. 9, 1969

3,483,414

STORAGE TUBE HAVING FIELD EFFECT LAYER WITH CONDUCTING PINS EXTENDING THERETHROUGH SO THAT READOUT DOES NOT ERASE CHARGE PATTERN

Benjamin Kazan, Pasadena, Calif., assignor to Xerox Corporation, Rochester, N.Y., a corporation of New York Filed Sept. 29, 1966, Ser. No. 582,861

Int. Cl. H01j *31/26*

U.S. Cl. 313—65 24 Claims

ABSTRACT OF THE DISCLOSURE

This application relates to an image pickup and storage device having a field effect semiconductor layer having conducting means imbedded therein and a plurality of individual mutually insulated conductors extending into said field effect semiconductor but spaced from said conducting means, means to form a charge pattern on the field effect semiconductor and means to scan the individual conductors whereby impedance variations between the individual conductors and the conducting means, as controlled by the input as represented by the charge pattern, can be detected.

In general, the present invention relates to visual-electrical storage tubes and more specifically to a field-effect storage and pickup tube.

Considerable difficulty is experienced in the use of prior art pickup and storage tubes. This difficulty arises from the fact that in most cases readout of the stored information automatically erases the stored charge pattern.

In prior art image devices, where a charge pattern created by optical or electrical means corresponding to an input signal is retained on an insulating surface and then used to generate an output signal or image; the readout process inherently disturbs or removes the charge pattern. In practically all devices in which a reading beam strikes the charged surface to produce the output, the charge pattern is directly erased during reading. If the beam does not land on the charged surface, it is discharged by ions generated within the tube.

The success of the prior art in increasing storage time is limited. The achievement of storage times comparable with those of the present invention by means of the prior art is accompanied by problems of undesired erasure or in special cases, the need to continue scanning the target with the electron beam to prevent loss of stored information.

The prior attempts to correct for these deficiencies have resulted in bulky, complex structures which require carefully controlled operating conditions.

The use of a pickup storage tube in a system may be precluded or curtailed because of the above noted deficiencies. For example, the prior art deficiencies constitute particularly severe limitations when the tube is to be a component of an aerial or satellite surveillance and reconnaissance system having military or weather applications.

Accordingly, it is an object of this invention to provide a new, highly efficient pickup and storage tube which overcomes the deficiencies of the prior art devices as described above.

A further object of the present invention is to provide a new, highly efficient pickup and storage method.

Another object is to provide a device capable of long storage times for transient images independent of readout conditions; that is, it is desired to provide a device in which electrical scanning of the stored image may be continued indefinitely without erasing or deteriorating the signal or influencing the storage time, and simultaneously it is desired to avoid any requirement that electrical power or scanning be maintained in order to store the image.

Additionally, it is an object to provide an improved device for the integrating and displaying of a low-level input image signal.

Further, it is an object of this invention that the storage or decay time can be separately controlled to provide for erasure without after-images at a variety of rates independent of the readout action.

It is a further object of this invention to eliminate attenuation, loss, or scattering of input radiation in the glass of the tube face by providing the input or photoconductive layer entirely external to the tube envelope.

Another object of the invention is to produce substantial modultaion of conductivity by a charge pattern of only several volts.

Other objects and a fuller understanding of the invention may be had by referring to the following description and claims, taken in conjunction with the accompanying drawings.

Broadly, the present invention utilizes trapped surface charges to control the conductivity of a field effect semiconductor. Any suitable optical input and electrical output may be employed. The readout of these conductivity variations disclosed as the preferred embodiment in this case is by scanning elements of the field effect layer with an electron beam to sense the conductivity variations from element to element in the layer. Alternatively, the invention may be utilized in a system where a stored image is readout by a metal probe mechanically scanning the elements. Further, the invention may be utilized in a system where a stored image is readout by applying a voltage across selected conductors of a crossed X-Y array as disclosed in copending application Ser. No. 582,856 filed Sept. 29, 1966.

Thus, specifically, the present invention overcomes the deficiencies of the prior art and achieves its objectives by utilizing trapped surface charges to control the conductivity of a photoconductive target of a camera pickup type tube. This control is achieved by use of a field-effect semiconductor layer on the outside surface of the tube face, the layer containing a conductive wire grid or contacting such a grid on the surface of the tube face. The tube face, in addition, has a mosaic of conducting pins extending through it in register with the open spaces of the grid. In operation, the field-effect layer is initially corona charged and then exposed to a transient light pattern corresponding to an image. A charge pattern is created by the photoconductive action of the light. The conductivity of the field-effect layer below the surface varies in accordance with the surface charge pattern and, thus, the resistance between the individual pins and the adjacent portion of the mesh electrode also varies across the tube face in accordance with the external stored charge pattern. An electron beam, then, scans the mosaic pin array and produces an electrical output signal by sensing the conductivity variations stored in the field-effect control layer, the signal generation being similar to the vidicon tube.

In order to facilitate understanding of the present invention, reference will now be made to the appended drawings of a preferred embodiment of the present invention. The drawings should not be construed as limiting the invention but are exemplary only. In the drawings.

Figure 1:
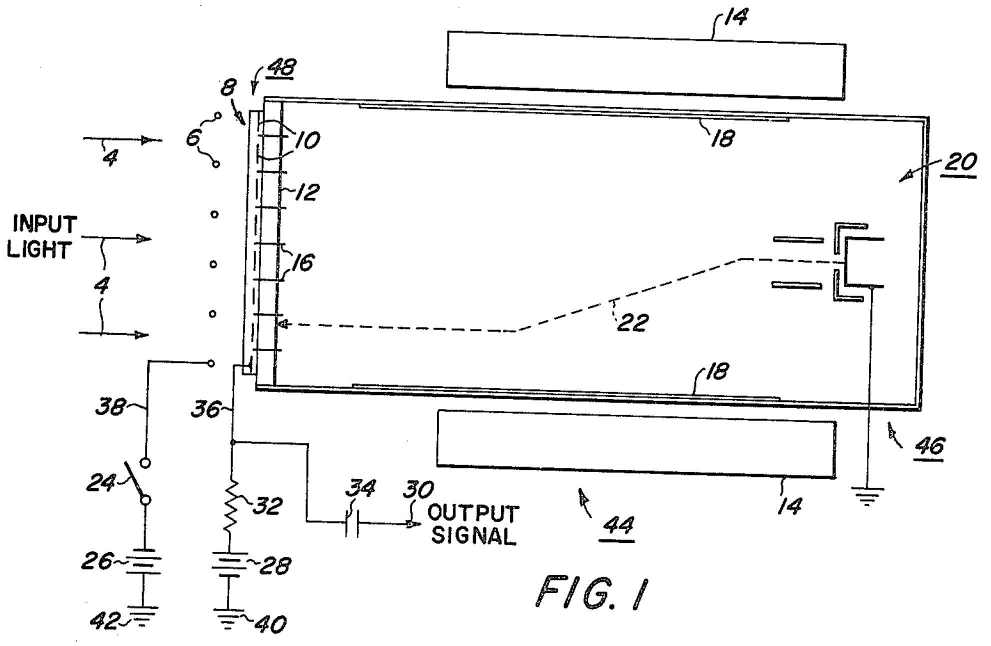
FIGURE 1 is a cross sectional diagrammatic representation of the present invention.

The general arrangement of a tube corresponding to the present invention is shown in cross section in FIGURE 1. A tube of the same general type as a vidicon tube is indicated by 44. Such a tube consists of an envelope 46 with a wall coating or anode 18 and an electron gun 20 which provides a scanning electron beam 22 of a low velocity type which is deflected and focused magnetically by the magnetic focusing coils and deflection yokes indicated at 14. The wall coating 18 is maintained positive, for example, at 300 volts and all other electrode voltages except as specifically altered herein are similar to those utilized in an operating vidicon tube.

The target of the tube indicated at 48 consists of a glass plate 12 having a mosaic of fine wire conductors or pins 16 extending through it. Extending over the outer surface of the glass plate 12 is a conducting mesh or grid 10 arranged so that its open spaces are in registry with the fine mosaic wires 16 which emerge through glass plate 12 without touching the conducting mesh 10. The term mesh or grid as utilized herein is intended to include a wire array, or a conductive array formed by etching the glass plate in a desired pattern and silvering the etched areas, or any other foraminous conductive layer. The fineness of the mesh determines the ultimate resolution of the system. A limitation on the mesh spacing is that of electrical breakdown between the mesh and mosaic wires determined by the applied voltages, the materials between the electrodes, etc. For example, thin evaporated metal layers forming grids 20 mils on centers with 50% coverage (i.e. 10 mils wide and spaced 10 mils apart) provide an operative grid. The conducting mesh 10 and outer surface of glass 12 are coated with a thin film or layer 8 of a field-effect semiconductor which will store charge until it is exposed to light or other electromagnetic radiation. This field-effect semiconductor is deposited on glass plate 12 and mesh 10 either as a continuous evaporated film or as a powder in a suitable plastic binder.

When a film of zinc oxide is utilized as the field effect semiconductor, this may be deposited by sputtering of zinc in an oxygen atmosphere or by first evaporating a layer of zinc and then oxidizing this to provide a thin zinc oxide layer.

In addition to the pin and mesh arrangement shown, alternative arrangements of spaced individual conductors may be employed to provide a means of detecting changes in conductivity with the field effect layer.

While zinc oxide is referred to throughout as the preferred embodiment of field effect semiconductor material, any other suitable material may be used. The general characteristics of zinc oxide other than its field-effect properties have been described in general in an article entitled "A Review of Electrofax," by James A. Amick, in RCA Review, December 1959, vol. 20, No. 4, pp. 753–769. See also Xerography and Related Processes, ed. Dessauer and Clark, New York: Focal Press, 1965, chapter 5. In addition to zinc oxide other typical field effect semiconductors include cadmium sulfide, cadmium oxide and lead oxide. However, zinc oxide is preferred because it is easy to deposit in thin film form, is photoresponsive and possesses good charge storing capability.

Figure 3:
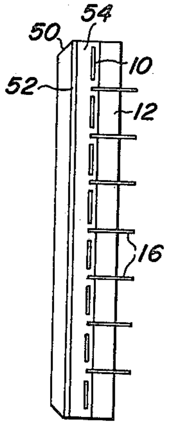
FIGURE 3 is a cross sectional diagrammatic representation of an alternative form of the target face.

An alternative form of the target face for use where the semiconductor is not photoresponsive is a target shown in FIGURE 3 in which two separate layers are utilized in lieu of a single field-effect semiconductor-photoconductor layer. In such an embodiment any suitable material 50 exhibiting the properties of an insulating photoconductor such as selenium, forms a layer over (i.e., external to) a layer 54 of the field-effect semiconductor material, for example cadmium sulfide or any other suitable semiconductor which need not also be photoconductive for use in this embodiment. Typical insulating photoconductors include arsenic trisulfide, amorphous selenium, arsenic-selenium alloys, metal free phthalocyanine, zinc sulfide or any one of many other photoconductors dispersed in particulate form in an insulating binder. A uniform surface charge is first formed on the photoconductive layer. By the photoconductive action of a light pattern a charge pattern is produced on the surface of the photoconductor. Corresponding to this charge pattern, local excess charges are induced in the underlying field-effect layer. A thin insulating or semiconducting layer 52 may also be provided between the photoconductive layer 50 and the field-effect layer 54 to prevent direct injection of charge, if this occurs, from the field-effect semiconductor into the photoconductor. The altered charge distribution on the photoconductive layer, by its field, thus affects the induced charge distribution in the field-effect layer and its point-to-point conductivity as detected by the method described below with regard to the preferred embodiment.

Figure 2:
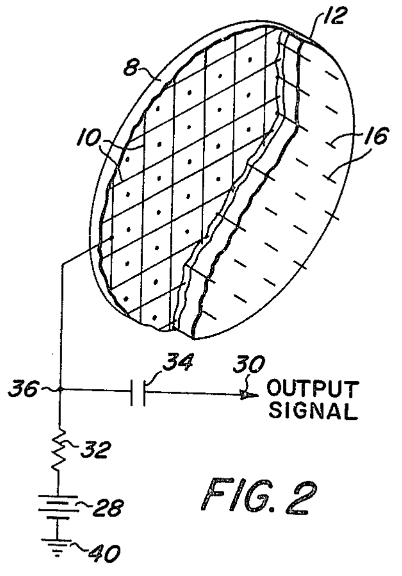
FIGURE 2 is a schematic representation of the tube face of the present invention.

A more detailed diagrammatic representation of the above described preferred embodiment of the target is provided by FIGURE 2. The conducting mesh or grid 10 is connected by conductor 36 through a series load resistor 32 to a source of direct current bias 28 which provides a positive potential, for example on the order of 20 volts with respect to the ground 40 or cathode of the electron gun. This potential may be varied in magnitude depending upon material selection, thickness, signal output required and other parameters. Connection of a video output detection circuit including capacitor 34 to conductor 36 provides for an output signal 30 from the target mesh 10.

Mounted in front of the zinc oxide layer at a suitable distance on the order of 1 centimeter is a set of fine conducting wires 6 which act as a corona discharge source. The corona source wires 6 are connected by conductors 38 through an erase switch 24 to a corona potential source 26 which provides a negative bias with respect to a ground 42 of from 5–7000 volts.

In operation, a negative voltage is momentarily applied to corona wires 6 by closing the erase switch 24 thus connecting corona supply 26 to wires 6. The application of this potential generates a corona which floods the surface of the zinc oxide layer 8 with a uniform negative charge created thereby, also, erasing any previous charge distribution, i.e., stored image. Other known means are also suitable for supplying a charge to the surface of the zinc oxide layer and may be utilized.

If a transient distributed pattern of light or other electromagnetic energy representative of an optical image is now projected onto the surface of the zinc oxide layer 8 as an input indicated by the arrows 4, a charge pattern will be created by the photoconductive action of the light which allows exposed areas to discharge. It should be noted that because of the small size of the corona wires 6, for example on the order of 1 mil in diameter, and because of their large relative spacing, they are out of focus and the interception of input light will be negligible.

The form of layer used in a photo-controlled field-effect device of one embodiment of the present invention consists of a layer of zinc oxide 8 which illustrates certain special properties. Negative ions formed from oxygen as a result of the corona effect will be deposited on the outer surface of the zinc oxide layer 8 and these negative oxygen ions will tend to retain their negative charges rather than giving them up to the body of the semiconductor. This negative charge reduces the conductance of the zinc oxide layer 8 by repelling free electrons out of the layer into the electrodes or to other portions of the layer. Insofar as the negative surface charges remain on the surface for a period of many minutes or even hours, the conductivity of the underlying zinc oxide remains correspondingly reduced for this time.

If, during the time that negative charges are trapped on the surface, illumination of appropriate wave length falls on the zinc oxide, hole-electron pairs are generated and some of these holes are attracted to the negative oxygen ions on the surface, thus neutralizing them. The result is an increase in conductance at local areas determined by the number of negative charges neutralized at the corresponding surface elements of the zinc oxide. Thus, control of the conductivity in a photoconductor is achieved by trapped surface charges.

Corresponding to the surface charge pattern, the conductivity of the zinc oxide material below the surface will vary. That is, beneath the negatively charged areas the conductivity will be low while beneath the areas optically discharged the conductivity will be high. The use of other suitable field-effect semiconductor materials allows for a reversal of applied polarity of the stored charge with corresponding change in the polarity of the conductivity pattern.

It should be noted that the process by which an image is formed on the face of the zinc oxide layer in the preferred embodiment makes possible a continuous total integration of transient low energy level input image signals since the photoconductive effect results in neutralization of the relatively large uniform, trapped surface charge pattern. Thus the output signal from an exposed area is a function of the integrated energy input over the time of exposure to the input signal.

The resistance from individual pins of the wire mosaic 16 in the glass face plate 12 to the mesh electrode 10 on the outer surface of the glass plate 12 in a path through the intervening zinc oxide of the zinc oxide layer 8 will thus vary across the tube face in accordance with the external stored charge pattern.

The scanning electron beam will sense the varying conductivity and corresponding resistance variation between the grid 10 and the mosaic wires 16 as it scans over the latter in a similar manner as in the conventional vidicon tube such as described by P. K. Weimer et al., Electronics, May 1950.

Figure 4:
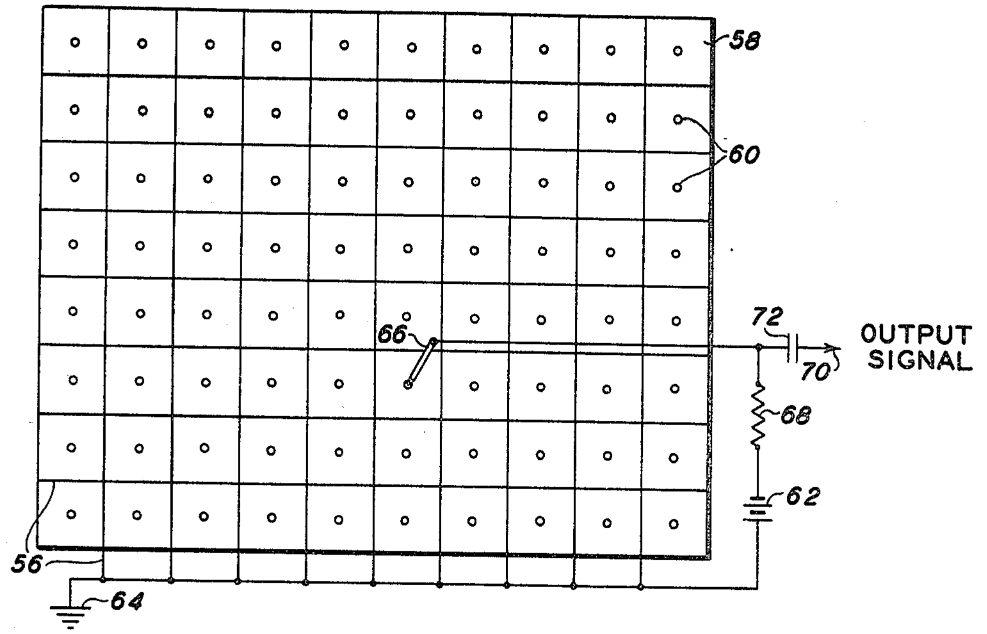
FIGURE 4 is a schematic representation of an alternative embodiment of the present invention.
Figure 5:
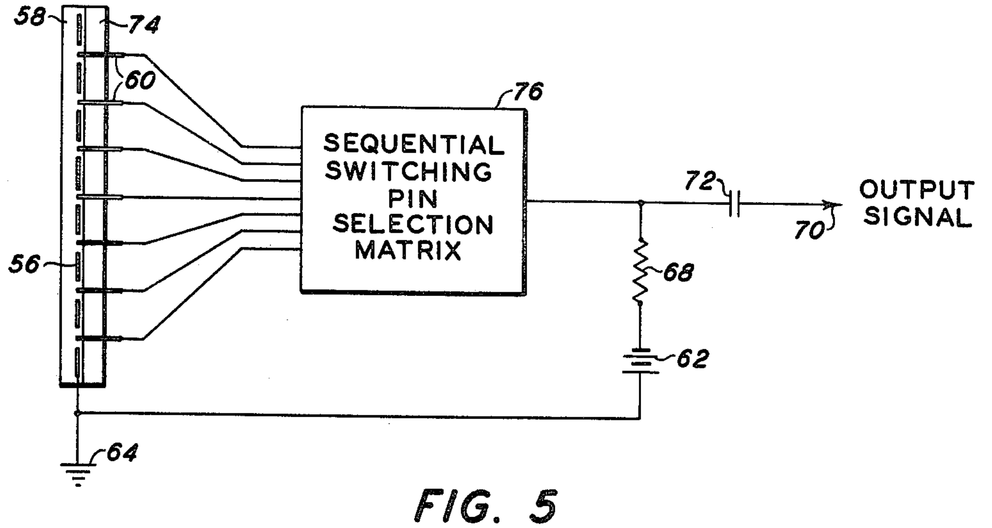
FIGURE 5 is a cross sectional diagrammatic representation of an alternative embodiment of the present invention.

An alternative readout system may employ the use of a dual electron beam or may utilize multiple or single mechanical probes. For example, one such alternative is shown in FIGURES 4 and 5. In FIGURE 4, conductive strips or a conductive matrix 56 is embedded in a layer of zinc oxide 58 in the same manner as the grid in the face of the tube structure described above. Between the conductive elements of the matrix are provided a plurality of isolated conductive elements or pins 60. The conductive matrix 56 and power supply 62 are connected to a common ground 64. The zinc oxide layer need not be associated with a camera tube but in this embodiment may be an independent modular unit. The zinc oxide layer is first corona charged and then selectively discharged by the action of a light pattern as described above with reference to the preferred embodiment. The field effect of the surface charge distribution alters the conductivity of the underlying portions of the layer as heretofore described. An electrical probe 66 is employed as a scanning means. As electrical contactor or probe 66 is sequentially moved from conducting pin 60 to conducting pin 60, voltage variations are produced across the load resistor 68. A varying output signal voltage 70 corresponding to the stored charge pattern is then coupled to appropriate circuitry through the capacitor 72.

As shown in FIGURE 5 the zinc oxide layer 58 may be deposited on a glass plate 74 which supports pins 60. A single electrical conductor probe such as 66 (shown in FIGURE 4) may be mechanically or electrically scanned so as to make individual mechanical contact with each of the pins 60 in sequence. Alternatively each of the conductive pins 60 may be connected electrically to a sequential switching pin selection matrix 76 which by known mechanical and/or electrical switching means provides for the connection of each of the conductive pins 60 to the power supply through the load resistor in sequence, thus resulting in a scanning of the conductive pins 60 to produce an output signal as indicated above.

In each of the embodiments either the single layer or double layer embodiment of the field effect semiconductor may be employed.

The variations in conductivity, regardless of how detected, produce a modulated output signal which may then be displayed by a suitable electronic image display system, such as a conventional storage or non-storage cathode ray tube, or the signal may be used for other purposes.

For example, the above modified system is useful in facsimile applications in which the stored transient image is electrically read-out by scanning the pins mechanically or electrically at a suitable rate.

If a direct current bias 28, for example, a positive 20 volts is applied through a series load resistor 32 to the mesh 10 which corresponds to the backplate of a conventional vidicon, the scanning of the glass target plate 12 with its exposed wire mosaic 16 will produce a video output signal 30 across the load resistor 32. Since the resistivity from each pin through the zinc oxide layer to the mesh varies with the charge pattern on the zinc oxide above this pin, the readout signal varies as the electron beam scans from pin to pin. Since the electron beam does not strike the charge pattern during readout, it is retained until it slowly leaks away or is intentionally erased.

It should be noted, however, that in the present invention, unlike the conventional vidicon, the scanning may be continued or cut off without disturbing the charge pattern or erasing the stored information. Laboratory observations indicate that storage times in excess of 8 hours are possible.

Since the storage action is dependent upon the field-effect control by stored charges, rapid erasure is possible and ghost images are minimized. When it is desired to erase a stored image charge pattern, the application of corona voltage 26 through erasure switch 24 for about a second or less has been found sufficient to remove the stored image charge and to recharge the surface of zinc oxide layer 8 for future use.

By lowering the corona voltage, by use of a series resistor for example, the erasing time may be arbitrarily lengthened, the image extending, for example, for many seconds or minutes.

Thus, in operation, the field-effect semiconductor is given a uniform charge as by corona discharge. A transient light pattern input selectively discharges the surface charge and alters the conductivity of the corresponding underlying areas of the field-effect semiconductor layer. This process results in an integration of the input image signal or capture of a transient image and the storage of the image until readout is desired. To read out the image an electron beam scans the pin mosaic and produces a signal in accordance with the conductivity from each pin (or group of pins) in sequence through the corresponding area of the field-effect semiconductor. The image may be repeatedly scanned without deterioration or may be erased at an arbitrary time by controlled application of corona voltage.

Although a specific preferred embodiment of the invention has been described in the detailed description above, the description is not intended to limit the invention to the particular forms or embodiments disclosed herein, since they art to be recognized as illustrative rather than restrictive and it will be obvious to those skilled in the art that the invention is not so limited. The invention is declared to cover all changes and modifications of the specific example of the invention herein disclosed for purposes of illustration, which do not constitute departures from the spirit and scope of the invention.

What is claimed is:

1. An image pickup and storage device comprising:
(a) a layer of a field effect semiconductor,
(b) means to form a charge pattern on said semiconductor, corresponding to an electromagnetic radiation pattern to be detected,
(c) conducting means embedded in said semiconductor,
(d) a plurality of individual mutually insulated, electrical conductors extending into said semiconductor, each of said conductors being separated from said conducting means by at least a portion of said semiconductor,
(e) means to scan said individual conductors, and
(f) means to detect changes in the instantaneous impedance between said individual conductors and said conducting means as said individual conductors are scanned by said scanning means.

2. An image pickup and storage device comprising:
(a) a supporting substrate,
(b) a conductive grid adjacent to one surface of said substrate,
(c) a layer of a field effect semiconductor material in contact with said conductive grid,
(d) a plurality of individual mutually insulated, electrical conductors extending into said semiconductor material, each of said conductors being separated from said conductive grid by at least a portion of said semiconductor material,
(e) means to form a pattern of electrostatic charges adjacent the surface of said semiconductor material most remote from said conductive grid, said pattern of charges serving to control by field effect the flow of current between each conductor and said conductive grid,
(f) means to scan said individual conductors, and,
(g) means to detect changes in the instantaneous electrical properties between said individual conductors and said conductive grid as said individual conductors are scanned by said scanning means.

3. The device of claim 2 wherein said conducting means is grounded.

4. The device of claim 3 wherein said means to scan is a mechanically moved electrical conductor probe.

5. The device of claim 3 wherein said means to scan is a sequential switching means for sequentially applying voltage to each of said individual conductors.

6. The device of claim 2 wherein said supporting substrate comprises an evacuated cathode ray tube envelope, and wherein said layer of a field effect semiconductor is on the external face of said envelope, and said plurality of individual mutually insulated, electrical conductors extend through the face of said envelope to said semiconductor.

7. The device of claim 6 wherein said means to scan said individual conductors comprise a scanning electron beam within said envelope.

8. The device of claim 7 wherein said conducting means is an electrically conducting mesh.

9. The device of claim 2 wherein said conductors are pins forming a conductive pin matrix.

10. The device of claim 2 wherein said field effect semiconductor is zinc oxide.

11. The device of claim 2 wherein said means to form a charge pattern on said semiconductor corresponding to an electromagnetic radiation pattern to be detected comprises corona means to uniformly charge the surface of said semiconductor and means for exposing the charged surface to a pattern of actinic electromagnetic radiation.

12. The device of claim 8 wherein the face of said envelope is an electrical insulator the prevent the erasure of the charge pattern during scanning by the electron beam.

13. The device of claim 2 further including means to uniformly recharge the surface of said semiconductor to provide for erasure of a stored image at a variety of rates.

14. The device of claim 9 further comprising a photoconductive layer adjacent said layer of semiconductor.

15. The device of claim 2 wherein said conductive grid is imbedded in said field effect semiconductor material.

16. The device is claim 2 wherein said conductive grid is in contact with said substrate and supported thereby, said field effect semiconductor material being in overlying contact therewith.

17. The device of claim 2 further including a photoconductor insulating material overlying said field effect semiconductor material.

18. The device of claim 2 further including an insulator layer sandwiched between said field effect semiconductor material layer and an overlying photoconductive layer.

19. The device of claim 2 wherein said change detecting means measures the instantaneous conductivity between said individual conductors and said conductive grid.

20. The device of claim 2 wherein said change detecting means measures the instantaneous impedance between said individual conductors and said conductive grid.

21. The device of claim 2 wherein said conductive grid is connected to a potential source.

22. The method of forming, storing, and reading out an integrated electromagnetic input image stored on the face of a cathode ray tube as a trapped charged pattern representative of said input image comprising:
(a) forming an electrostatic charge pattern adjacent the surface of a field effect semiconductor layer supported by the external surface of the face plate of a cathode ray tube, whereby said charge pattern is stored thereon and is representative of said input image,
(b) sequentially scanning a plurality of mutually insulated, electrical conductors extending through the tube face plate into the semiconductor with an electron beam to provide a signal indicative of the local electrical properties of said semiconductor, and
(c) detecing a signal representative of the local electrical properties of said semiconductor adjacent the conductor being scanned through an electrically conductive mesh which is separated from said conductors by a portion of said semiconductor.

23. The method of claim 22 wherein said charge pattern is formed adjacent the surface of said field effect semiconductor layer by utilizing a field effect semiconductor also having photoconductive insulating properties, uniformly charging said field effect semiconductor and exposing the charged surface to a pattern of actinic electromagnetic radiation.

24. The method of claim 22 further including the step of recharging the surface of said field effect semiconductor layer to erase the previously stored trapped surface charge.

References Cited

UNITED STATES PATENTS

| | | | |
|---|---|---|---|
| 3,069,551 | 12/1962 | Haine | 250—213 |
| 3,136,909 | 6/1964 | Cope | 313—65 |
| 3,225,240 | 12/1965 | Sybeldon | 313—65 |

RALPH G. NILSON, Primary Examiner

M. ABRAMSON, Assistant Examiner

U.S. Cl. X.R.

313—68; 315—10